(12) United States Patent
Mangels et al.

(10) Patent No.: US 11,307,548 B2
(45) Date of Patent: Apr. 19, 2022

(54) SIGNAL AND EVENT PROCESSING ENGINE

(71) Applicant: Siemens Aktiengesellschaft, Munich (DE)

(72) Inventors: Tatiana Mangels, Munich (DE); Dan Puiu, Brasov (RO); Mikhail Roshchin, Munich (DE); Ioana Stefan, Brasov (RO); Alexey Fishkin, Munich (DE)

(73) Assignee: SIEMENS AKTIENGESELLSCHAFT

( * ) Notice: Subject to any disclaimer, the term of this patent is extended or adjusted under 35 U.S.C. 154(b) by 0 days.

(21) Appl. No.: 16/957,074

(22) PCT Filed: Dec. 20, 2018

(86) PCT No.: PCT/EP2018/086123
§ 371 (c)(1),
(2) Date: Jun. 22, 2020

(87) PCT Pub. No.: WO2019/129629
PCT Pub. Date: Jul. 4, 2019

(65) Prior Publication Data
US 2020/0363781 A1    Nov. 19, 2020

(30) Foreign Application Priority Data
Dec. 28, 2017  (RO) .............................. a 2017 01175

(51) Int. Cl.
*G05B 19/04*  (2006.01)
*G05B 19/042* (2006.01)
(Continued)

(52) U.S. Cl.
CPC ..... *G05B 19/0423* (2013.01); *G05B 19/0421* (2013.01); *G05B 19/054* (2013.01); *G05B 19/4185* (2013.01); *G06F 16/24568* (2019.01)

(58) Field of Classification Search
CPC ............... G06F 16/24568; Y02P 90/02; G05B 19/0421; G05B 19/054; G05B 19/4185; G05B 19/05; G05B 19/042
See application file for complete search history.

(56) References Cited

U.S. PATENT DOCUMENTS

2002/0073330 A1* 6/2002 Chandnani ............ G06F 21/563
726/26
2005/0080880 A1* 4/2005 von Tetzchner .. H04M 1/72445
709/219
(Continued)

FOREIGN PATENT DOCUMENTS

WO    2017035536 A1    3/2017

OTHER PUBLICATIONS

PCT International Search Report dated Feb. 20, 2019 and corresponding to PCT International Application No. PCT/EP2018/086123 filed on Dec. 20, 2018.

*Primary Examiner* — Tuan C Dao
(74) *Attorney, Agent, or Firm* — Schmeiser, Olsen & Watts LLP

(57) ABSTRACT

Provided is a signal and event processing, SEP, engine deployed on a target device of an industrial system, the SEP engine including subscriber nodes adapted to receive at least one of signal and event, SE, data streams from sources of the industrial system; processing nodes adapted to perform signal and event processing language, SEPL, functional operations on the received SE data streams according to an SEPL script of the SEP engine, wherein the SEPL script includes predefined stateful event or data pattern matching operations to generate result SE data streams; and publisher nodes adapted to forward the generated result SE data streams to sinks of the industrial system.

18 Claims, 9 Drawing Sheets

(51) Int. Cl.
*G06F 16/2455* (2019.01)
*G05B 19/05* (2006.01)
*G05B 19/418* (2006.01)

(56) References Cited

U.S. PATENT DOCUMENTS

| | | | |
|---|---|---|---|
| 2006/0282498 A1* | 12/2006 | Muro | H04L 67/12 |
| | | | 709/203 |
| 2009/0076665 A1* | 3/2009 | Hoisington | G05D 1/0044 |
| | | | 701/2 |
| 2012/0210012 A1* | 8/2012 | Jansson | H04L 67/2809 |
| | | | 709/230 |
| 2015/0161214 A1 | 6/2015 | Kali et al. | |
| 2017/0017901 A1* | 1/2017 | Firooz | G05B 23/0283 |
| 2017/0277521 A1* | 9/2017 | Sharma | G06F 16/9535 |
| 2017/0287090 A1* | 10/2017 | Hunn | H04L 9/0643 |
| 2017/0289240 A1 | 10/2017 | Ghare et al. | |
| 2019/0108071 A1* | 4/2019 | Cyr | H04L 67/26 |
| 2020/0043316 A1* | 2/2020 | Moon | G01C 21/3461 |

\* cited by examiner

SIGNAL AND EVENT PROCESSING ENGINE

CROSS-REFERENCE TO RELATED APPLICATIONS

This application claims priority to PCT Application No. PCT/EP2018/086123, having a filing date of Dec. 20, 2018, which is based off of RO Application No. A 2017 01175, having a filing date of Dec. 28, 2017, the entire contents both of which are hereby incorporated by reference.

FIELD OF TECHNOLOGY

The following relates to a signal and event processing engine which can be deployed and executed on a target device of an industrial system.

BACKGROUND

An industrial system can comprise a plurality of machines and/or machine components which can be monitored on the basis of signal or event data streams. An industrial system can comprise a plurality of different industrial assets. For instance, for an oil and gas platform, an industrial system can comprise gas turbines and other components such as bearing devices, gear devices or pumps where sensor signal sources generate sensor data streams which can be collected by distributed applications to generate time series of observation events. Sensor or field instruments such as programmable logic controllers can generate data which can be processed and analyzed either in an on-line mode, i.e. near-real-time processing, or in an off-line mode, i.e. batch processing.

In the domain of PLC programming, the programs are typically written in a special application on a personal computer using for instance function block diagrams FBD, a ladder logic diagram LD, a structured text ST, an instruction list IL or a sequential function chart SFC. Field engineers, operators and maintenance engineers which are most familiar with industrial assets of the industrial system may have some knowledge of PLC programming languages. However, PLC programming languages are not suitable for solving most of condition monitoring tasks via stream processing since they do not include features available in the analysis domain. Data processing tools of the data analytics domain are more suitable for analysis of data streams. The data analysis domain consists of a wide range of technologies and can be realized as application programming interfaces API in general programming and querying languages such as the Structured Query Language (SQL), Scala, Python, Java, C++. Since application programming interfaces API are designed for solving standard stream processing tasks, they provide generic events, basic event operations, temporal event operations and/or event processing networks.

For condition-based maintenance and conditioning monitoring of an industrial system and to perform diagnostic tasks, it is necessary to detect patterns within data streams or event streams provided by signal sources within the industrial system. Conventional pattern formulation tools or matching programs are written using tools which are familiar to experts of the data analytics domain but which are not familiar to field engineers, operators or maintenance engineers having assets-specific knowledge of the industrial system. For instance, a field engineer is normally not familiar with processing languages such as Python, Scala and Java or with a Structured Query Language SQL. On the other hand, data analytics specialists normally have little knowledge about the industrial assets of the respective industrial system. As a consequence, the formulation of pattern recognition programs is very cumbersome, complicated and time-consuming requiring an intensive interaction between field engineers, operators and data analytics specialists. Moreover, the resulting analytical programs which can be used for data and/or event pattern matching comprise a large footprint and cannot be deployed easily on target devices with limited resources. Because of the relative poor knowledge of the data analytics experts about the assets of the industrial system, the resulting data analytic programs do not comprise an optimal performance.

SUMMARY

Accordingly, an aspect relates to provide an apparatus and a method for processing of signal and/or event data streams which simplify pattern matching and increase a performance of pattern matching within signal and/or event data streams of an industrial system.

Embodiments of the invention provide according to the first aspect a signal and event processing, SEP, engine deployed on a target device of an industrial system, said SEP engine comprising:
subscriber nodes adapted to receive signal and/or event, SE, data streams from sources of said industrial system,
processing nodes adapted to perform signal and event processing language, SEPL, functional operations on the received SE data streams according to an SEPL script of said SEP engine,
wherein the SEPL script includes predefined stateful event or data pattern matching operations to generate result SE data streams and
publisher nodes adapted to forward the generated result SE data streams to sinks of said industrial system.

In a possible embodiment of the signal and event processing, SEP, engine according to the first aspect of embodiments of the present invention, each node of the SEP engine deployed on said target device is adapted to perform an associated functional operation forming part of the SEPL script, wherein the functional operation comprises a stateless functional SEPL operation or a stateful functional SEPL operation.

In a further possible embodiment of the signal and event processing, SEP, engine according to the first aspect of embodiments of the present invention, each processing node of the deployed SEP engine is adapted to apply a predefined SEPL functional operation on SE data streams received by at least one subscriber node or output by at least one preceding processing node and to deliver a resulting SE data stream to a subsequent processing node and/or to a publisher node of the deployed SEP engine.

In a still further possible embodiment of the signal and event processing, SEP, engine according to the first aspect of embodiments of the present invention, the SE data streams comprise signal data streams generated by signal generation sources of the industrial system and/or event data streams generated by event generation sources of the industrial system.

In a further possible embodiment of the signal and event processing, SEP, engine according to the first aspect of embodiments of the present invention, the event data stream comprises a time series of events containing features represented as key-value pairs.

In a still further possible embodiment of the signal and event processing, SEP, engine according to the first aspect of embodiments of the present invention, the signal data stream comprises sensor data streams provided by sensors forming sources of the industrial system.

In a still further possible embodiment of the signal and event processing, SEP, engine according to the first aspect of embodiments of the present invention, the nodes of the deployed SEP engine form an SEP network comprising a directed acyclic graph, DAG.

In a further possible embodiment of the signal and event processing, SEP, engine according to the first aspect of embodiments of the present invention, the deployed SEP engine is implemented as a software component or as a hardware component and deployed on the target device forming part of said industrial system or being connected to said industrial system.

In a still further possible embodiment of the signal and event processing, SEP, engine according to the first aspect of embodiments of the present invention, the target device on which the SEP engine is deployed comprises a programmable logic controller, PLC, a computer, a computer cluster, a client, a server, a control unit of said industrial system or a cloud unit of a network cloud connected to said industrial system.

In a further possible embodiment of the signal and event processing, SEP, engine according to the first aspect of embodiments of the present invention, the sources adapted to supply SE data streams to the subscriber nodes of the deployed SEP engine and/or the sinks adapted to receive the generated result SE data streams from the publisher nodes of said SEP engine comprise entities or devices including other SEP engines, servers, clients, computers and/or databases of the industrial system.

In a still further possible embodiment of the signal and event processing, SEP, engine according to the first aspect of embodiments of the present invention, the SEP engine deployed on the target device is configured to communicate with other SEP engines deployed on other target entities or devices of said industrial system by means of an event message broker.

In a further possible embodiment of the signal and event processing, SEP, engine according to the first aspect of embodiments of the present invention, the SEPL scripts of said SEP engine are loaded from an SEPL script library stored in a domain specific or cross domain knowledge database and instantiated for the respective target device of said industrial system.

In a still further possible embodiment of the signal and event processing, SEP, engine according to the first aspect of embodiments of the present invention, the SEPL script of the deployed SEP engine includes one or more predefined stateful functional SEPL window event pattern matching operations each adapted to validate event patterns mined from historic data of recorded and stored SE data streams within an SE data stream received by a subscriber node of the batch processing SEP engine for a sliding time window with a configurable time window length to generate matching results forming a result SE data stream output by a publisher node of the deployed batch processing SEP engine.

In a further possible embodiment of the signal and event processing, SEP, engine according to the first aspect of embodiments of the present invention, the SEPL script of the deployed SEP engine includes one or more predefined stateful functional SEPL delay operations each adapted to delay SE data streams received by subscriber nodes of said SEP engine with configurable delay time periods to provide delayed SE data streams output as result SE data streams by publisher nodes of said deployed SEP engine.

In a further possible embodiment of the signal and event processing, SEP, engine according to the first aspect of embodiments of the present invention, the SEPL script comprises besides stateful functional event or data pattern matching or delaying SEPL operations stateless functional SEPL operations comprising:
subscriber SEPL operations, constant defining SEPL operations, conversion SEPL operations, SE data stream merging SEPL operations, arithmetical functional operations with one or more arguments, select SEPL operations to select features from SE data streams, string processing SEPL operations, data time SEPL operations and publishing SEPL operations.

In a further possible embodiment of the signal and event processing, SEP, engine according to the first aspect of embodiments of the present invention, predefined SEP engines provided for different language types including C++, C #, Java are stored with an associated SEPL script library in a knowledge database, wherein a fitting SEPL engine is loaded, instantiated and deployed on the target device of the industrial system.

Embodiments of the invention further provide according to a further second aspect a system conditioning monitoring, SCM, and/or condition-based maintenance, CBM, platform comprising one or more SEP engines according to the first aspect of embodiments of the present invention, wherein SCM/CBM rules of said platform are written as SEPL scripts of SEP engines deployed on target devices of the industrial system.

Embodiments of the invention provide according to the third aspect a target device of an industrial system comprising at least one SEP engine according to the first aspect of embodiments of the present invention, instantiated and deployed on said target device, wherein the deployed SEP engine is executable to perform online and/or offline processing of SE data streams received from sources of said industrial system to generate result SE data streams forwarded to sinks of the industrial system.

Embodiments of the invention provide according to a fourth aspect a method for online and/or offline processing of signal and/or event, SE, data streams of an industrial system,
the method comprising the steps of:
receiving SE data streams from sources of the industrial system,
performing signal and event processing language, SEPL, functional operations on the received SE data streams according to an SEPL script of a signal and event, SEP, engine deployed on at least one target device of said industrial system,
wherein the SEPL script includes predefined stateful event or data pattern matching operations to generate result SE data streams, and
forwarding the generated result SE data streams to sinks of said industrial system.

BRIEF DESCRIPTION

Some of the embodiments will be described in detail, with reference to the following figures, wherein like designations denote like members, wherein.

DETAILED DESCRIPTION

Figure 1:
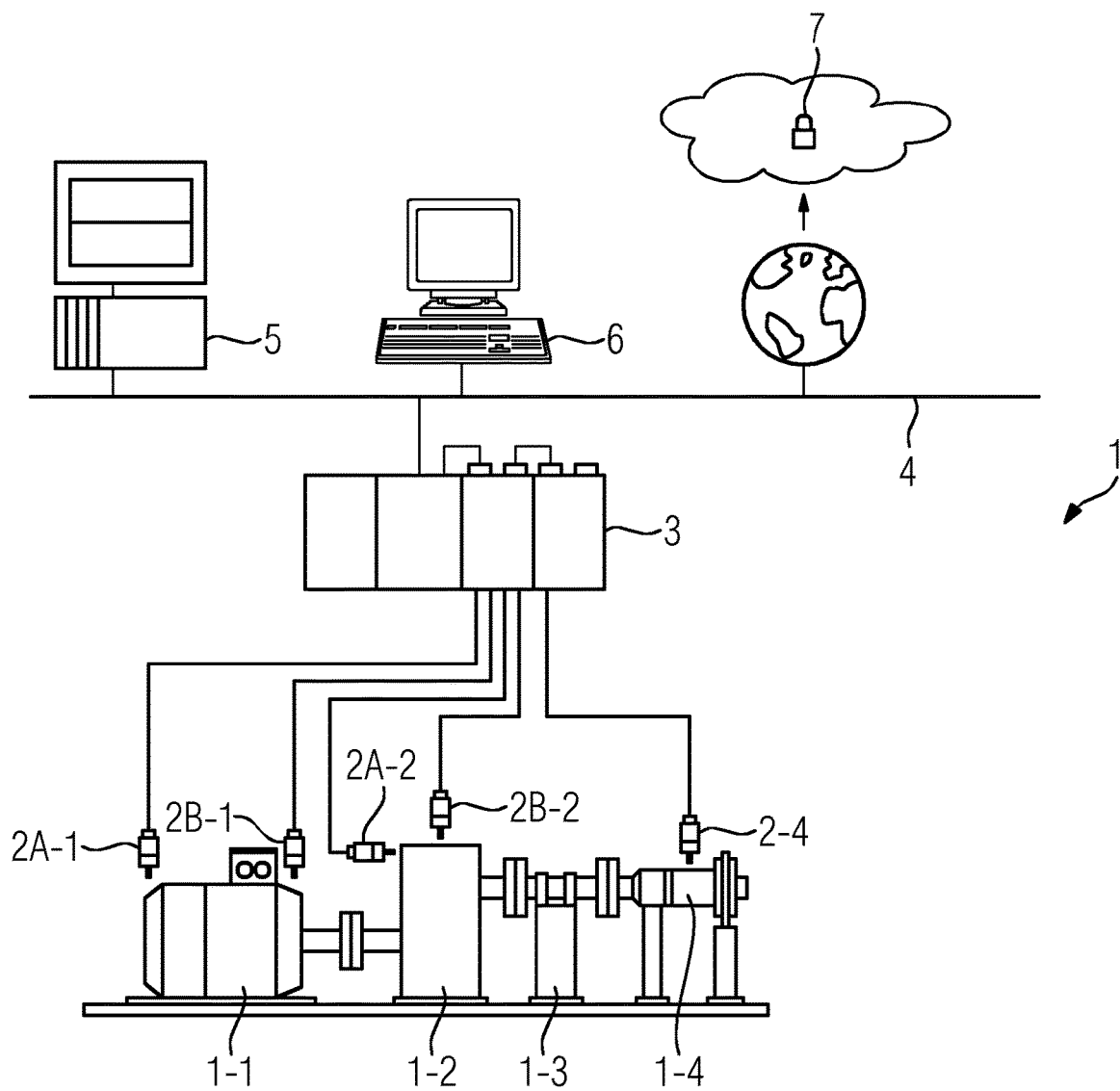
FIG. 1 shows an exemplary industrial system where one or more SEP engines according to the present invention can be deployed.

As can be seen in the schematic diagram of FIG. 1, the illustrated exemplary industrial system 1 shown in FIG. 1 can comprise a plurality of components including hardware components and/or software components. The industrial system 1 can comprise a machine and machine components interacting with each other. In the illustrated exemplary industrial system 1, a drive train is provided consisting of a drive 1-1, a gear component 1-2, a bearing 1-3 and a pump 1-4. Each component of the industrial system 1 such as the illustrated drive train can comprise one or several signal sources. Signal sources can comprise sensors generating sensor data of the system during operation of the industrial system 1. The different sensors can supply analog signals or digital sensor data to a control unit of the industrial system 1 as illustrated in FIG. 1. In the shown example of FIG. 1, two sensor signal sources 2A-1, 2B-1 provided at the drive unit 1-1 of the industrial system 1 provide sensor signals to a controller 3 such as a SIMATIC S7 control unit. Further, signal sources 2A-2, 2B-2 provided at the gear unit 1-2 of the industrial system 1 provide data streams to the controller 3 of the industrial system 1. In the illustrated example, the local controller 3 of the industrial system 1 further receives a sensor signal from a sensor 2-4 provided at the pump unit 1-4 of the industrial system 1. The type of the sensors or signal sources can vary depending on the use case. The sensors can, for instance, comprise vibration sensors, temperature or pressure sensors providing analog sensor signals converted by an analog digital converter ADC into signal data streams. Further, local programmable logic controllers PLC can be provided which aggregate observations into events supplied to the local controller 3 of the industrial system 1. The local controller 3 such as SIMATIC S7 can be connected via a bus 4 to a platform 5 including CMS tools for performing data analytics. Further, a computer or a SCADA entity 6 can be connected to the common bus 4 of the industrial system 1. The SCADA entity 6 can have access to a database. Further, the local bus 4 of the industrial system 1 can provide a remote access, for instance via the internet, to a background cloud 7 as illustrated in FIG. 1. The bus 4 of the industrial system 1 can comprise for instance a PROFINET bus or an Ethernet bus. The local controller or PLC 3 of the industrial system 1 can receive event data streams from event data sources of the industrial system 1, e.g. from other distributed programmable logic control units PLC. Further, events can be supplied to the local controller 3 from entities or units within the cloud 7 within the SCADA unit 6 or within the analytical processing unit 5. The industrial system 1 can comprise one or more signal and event processing, SEP, engines according to the first aspect of embodiments of the present invention. In a possible embodiment, several signal event processing, SEP, engines according to the first aspect of embodiments of the present invention are distributed in the industrial system 1 to perform different tasks. In a possible embodiment, signal and event processing, SEP, engines are deployed on target devices of the industrial system 1, in particular on programmable logic controllers, PLC, located close to the machine components 1-$i$ to process local sensor data which may be aggregated into event data streams supplied to other PLCs of subsystems of the industrial system 1. Further, one or more signal and event processing, SEP, engines according to the first aspect of embodiments of the present invention can be implemented in the controller 3 of the industrial system 1 as shown in FIG. 1. Other signal and event processing, SEP, engines can be further deployed on the analytical processing unit 5, the SCADA device 6 and/or on entities of the system cloud 7. The different SEP engines deployed on the same or different target devices of the industrial system 1 are configured to communicate with each other. In a possible embodiment, the SEP engines communicate with each other by means of event message brokers.

Figure 2:
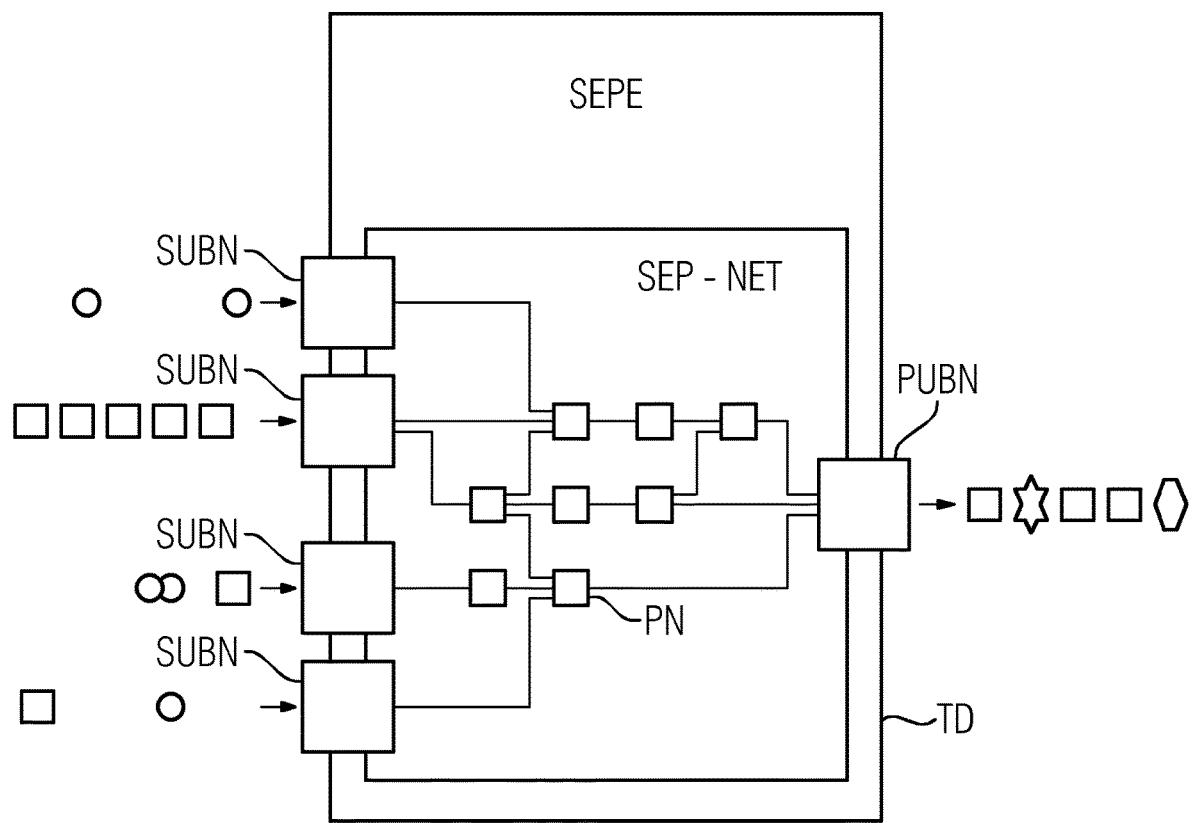
FIG. 2 shows a schematic diagram of a possible exemplary embodiment of a signal and event processing, SEP, engine according to an aspect of the present invention.

FIG. 2 illustrates schematically a possible exemplary embodiment of a signal and event processing, SEP, engine SEPE deployed on a target device TD of the industrial system 1. The SEP engine can be deployed on different kinds of target devices TD of the industrial system 1 including programmable logic controllers, PLC, computers, computer clusters, client devices, server devices, control units of the industrial system 1 or cloud units of a system network cloud connected to the industrial system 1. On each target device TD of the industrial system 1, one or more SEP engines can be deployed for performing different tasks. As can be seen in the schematic diagram of FIG. 2, the signal and event processing, SEP, engine SEPE deployed on a target device TD of the industrial system 1 comprises in the illustrated embodiment one or more subscriber nodes SUBN, processing nodes PN and one or more publisher nodes PUBN. The number of nodes can vary depending on the use case. The signal and event processing, SEP, engine SEPE as illustrated in FIG. 2 comprises several subscriber nodes SUBN adapted to receive signal and/or event, SE, data streams from sources of the industrial system 1. The received signal and/or event, SE, data streams comprise signal data streams generated by signal generation sources of the industrial system 1, in particular signal sensors, and/or event data streams generated by event generation sources of the industrial system 1. Each SE data stream comprises time series data applied to the subscriber nodes SUBN of the signal and event processing, SEP, engine. The SEP engine further comprises processing nodes PN adapted to perform signal and event processing language, SEPL, functional operations on the received SE data streams according to an SEPL script of the SEP engine. The SEPL script includes predefined stateful event or data pattern matching operations to generate result SE data streams. The signal and event processing, SEP, engine further comprises publisher nodes PUBN adapted to forward the generated result SE data streams to sinks of the industrial system 1. Each node of the SEP engine SEPE deployed on the respective target device TD is adapted to perform an associated functional operation forming part of the SEPL script. The functional operation is a stateless functional SEP operation or a stateful functional SEP operation, in particular an event or data pattern matching functional operation. Each processing node PN of the deployed SEP engine is adapted to apply a predefined SEPL functional operation on SE data streams received by at least one subscriber node SUBN or output by at least one preceding processing node PN and to deliver a resulting SE data stream to a subsequent processing node PN and/or to a publisher node PUBN of the deployed SEP engine SEPE as also illustrated in the exemplary embodiment of FIG. 2. The subscriber node SUBN interprets and validates the data coming from the external sources and delivers the results via the publisher nodes PUBN to the external sinks. Each node of the SEP network SEP-NET of nodes applies an SEP operation on the received input data coming from the preceding or previous SEPL nodes or subscriber nodes SUBN. The result of the processing is delivered to the following SEPL nodes or to the publisher nodes PUBN of the SEPL network. Each node may implement one and only one functional SEPL operation. The nodes of the deployed SEP engine form an SEP network SEP-NET comprising a directed acyclic graph, DAG, as also shown in the example of FIG. 2. The SEP engine SEPE illustrated in FIG. 2 can be implemented as a software component or as a hardware component and deployed on a target device TD of the industrial system 1. The target device TD can form part of the industrial system 1 or can be connected to the industrial system 1. The sources adapted to supply SE data streams to the subscriber nodes SUBN of the deployed SEP engine as shown in FIG. 2 and/or the sinks adapted to receive the generated result SE data streams from the publisher nodes PUBN of the SEP engine can comprise different entities or devices including other SEP engines deployed on other target devices, servers, clients, computers and/or databases of the industrial system 1. The SEPL script of the SEP engine can be loaded in a possible embodiment from an SEPL script library stored in a domain-specific or cross domain knowledge database and instantiated for the respective target device TD of the industrial system 1. The SEP engine is adapted to execute the SEPL script. The SEP engine parses the SEPL script and creates thereby a SEP network. Then the SEP engine can be started to operate on input SE data streams.

The SEPL script of the deployed SEP engine can include one or more predefined stateful functional SEPL window event pattern matching operations each adapted to validate event patterns mined from historic data of recorded and stored SE data streams within received SE data streams received by one or more subscriber nodes SUBN of the batch processing SEP engine for a sliding time window. The sliding time window can comprise a configurable time window length TWL. The matching is performed to generate matching results forming a result SE data stream output by a publisher node PUBN of the deployed batch processing SEP engine. From historic data some characteristic patterns are derived, i.e. mined. These patterns are formulated as SEPL scripts and validated using the batch processing SEP engine. The SEPL scripts can then be deployed for the execution in an online mode on the target devices.

The SEPL script of the deployed SEP engine can include also one or more predefined stateful functional SEPL delay operations. The SEPL delay operations are adapted to delay SE data streams received by a subscriber node SUBN of the SEP engine with a configurable delay time period to generate delayed SE data streams output as result SE data streams by a publisher node PUBN of the deployed SEP engine.

Besides the stateful functional event or data pattern matching or delaying SEPL operations, the SEPL script of the deployed SEP engine SEPE can comprise also stateless functional SEPL operations. These stateless functional SEPL operations can comprise subscriber SEPL operations, constant determining SEPL operations, conversion SEPL operations, SE data stream merging SEPL operations, arithmetical functional operations with one or more arguments, select SEPL operations to select features from SE data streams, string processing SEPL operations, data time SEPL operations, filtering SEPL operations and/or publishing SEPL operations. The SEPL operations are useful for performing analysis of the received SE data streams. They are easily understood by operators and field engineers having working knowledge of PLC programming languages. The SEP engine SEPE can be deployed on running SEP networks on different hardware platform classes including for instance smartphones, servers or clusters. The SEP network SEP-NET can contain multiple processing nodes. Each node of the SEP network can apply a single operation on the data coming from a preceding input node and delivers the result to an output node. In a possible embodiment, predefined SEP engines provided for different language types including C++, C #, Java can be stored within an associated SEPL script library in a knowledge database of the system 1, wherein a fitting SEP engine is loaded, instantiated and deployed on a target device TD of the industrial system 1. To support the SEP operations across different hardware platforms different versions of the SEP engine, i.e. C++, C #.NET, Java EE and a cluster SEP engine based on Apache FUNK can be provided. Apache FUNK is a processing platform which exposes a dedicated API written in Java for implementation of stream processing tasks. The SEP engine can be realized using the API on the FLINK platform. Each specific engine can be delivered as a dedicated library which implements a standardized API with a set of basic functionalities required for integration in any software development project. Further, each SEP engine can come along with a so-called SEP worker application which is adapted to wrap the library API into a set of REST services. Using REST services for the SEP worker application is just one possible realization. Other possibilities include the use of sockets, communication buses or any other protocols. The latter feature can form a standardized REST API for all versions of the SEP worker application. The provision of libraries, engines and workers allows a rapid integration in almost any condition monitoring application.

The system can comprise a graphical user interface for creating different kinds of SEP networks implemented in an SEP engine as illustrated in FIG. 2. Further, the interface can be used for configuring SEPL operations performed by nodes of the created SEP network. The interface can also be used for testing and deploying the created SEP networks. An SEP laboratory application implementing the interface facilitates a rapid development, testing and deployment of SEP networks within SEP engines. In a possible embodiment, each SEP network can be configured by adding SEPL operations one by one. For each added SEPL operation, it is possible to define input streams for preceding operations. This can be performed to avoid cycles in the SEP network ensuring that it always comprises a directed acyclic graph DAG. As soon as the working SEP network is ready, a user can load a set of .csv files with event information. Any type of historical data source can be used, not necessarily .csv files. To start a testing process, it is possible to select one of the available SEP worker applications and start a simulation of event streams from the respective .csv files. In a possible embodiment, the SEP laboratory application can deploy the created SEP network on the SEP worker application via the provided REST services and can then forward all input data streams to it. In a possible embodiment, the SEP laboratory application can collect and visualize all data streams returned from the worker application, respectively. The process of development, testing and deployment of SEP networks using the SEP laboratory application is quite intuitive and seamless. It is possible, to form collections of SEP networks which solve most common condition monitoring tasks, e.g. for transducers, valves, vanes, pressure pipes, motors, etc. implemented in the industrial system 1. The application of the signal and event processing, SEP, engine with an implemented SEP network does not require any specific programming knowledge by the field engineer, but only a knowledge of the underplaying assets of the industrial system 1.

Figure 3:
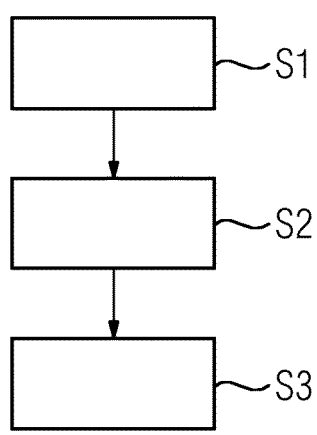
FIG. 3 shows a flowchart of a possible exemplary embodiment of a method for processing of signal and event data streams of an industrial system according to a further aspect of the present invention.

FIG. 3 shows a flowchart of a possible exemplary embodiment of a method for processing of signal and/or event, SE, data streams of an industrial system 1 according to a further aspect of embodiments of the present invention. The illustrated method is adapted to perform online and/or offline processing of SE data streams of an industrial system 1. In the illustrated exemplary embodiment, the method comprises three main steps.

In a first step S1, SE data streams are received by the SEPE from sources of the industrial system 1.

In a further step S2, signal and event processing language, SEPL, functional operations on the received SE data streams are performed according to an SEPL script of a signal and event, SEP, engine SEPE deployed on at least one target device TD of the industrial system 1. The SEPL script includes in a possible embodiment predefined stateful event and/or pattern matching operations, in particular window event pattern matching operations, to generate result SE data streams.

In a further step S3, the generated result SE data streams are forwarded by the SEPE to sinks of the industrial system 1.

Embodiments of the invention provide according to a further aspect a system conditioning monitoring, SCM, and/or condition-based maintenance, CBM, platform comprising one or more SEP engines according to the first aspect of embodiments of the present invention and adapted to perform the method illustrated in FIG. 3. In the SCM and/or CBM system SCM/CBM rules of the platform are written as SEPL scripts of SEP engines deployed on target devices TD of the industrial system 1. It is always important to improve system performance and to reduce system maintenance costs. Accordingly, industrial IoT use cases focus on conditioning monitoring, SCM, and condition-based maintenance, SBM, where deep domain-specific knowledge is required. The use of the signal and event processing, SEP, engine according to embodiments of the present invention allows to provide powerful SCM/CBM platforms which can be configured and run in almost any industrial environment. For example, it is possible to easily retrofit and enhance any existing SCM/CBM solutions. Further, SEPL tools provided by use of signal and event processing, SEP, engines according to embodiments of the present invention can provide a comfortable environment for development and dissemination of SCM/CBM rules written as SEPL scripts. These SEPL scripts can consume industrial IoT data streams, in particular sensor signals and system logs, and can infer streams of conclusions about a system status of the industrial system 1, in particular state indications, fault indications and/or failure modes, estimated failure probabilities, probable root cases, required operational actions and maintenance activities. Such a SCM/CBM script can be classified and stored in either a domain-specific or cross domain knowledge database. Embodiments of the present invention provide cross platform deployment possibilities. For instance, a C++ SEP engine can be used primarily for restricted devices, whereas Java/C #SEP engines can be used for commodity computers and servers and respective SEP cluster engines for distributed environments. The SEP engines according to embodiments of the present invention can be easily used by field engineers. In a possible embodiment, the SEP engine according to embodiments of the present invention can provide a graphic user interface application for creating, testing and deployment of the SEP network implemented in the SEP engine. It is possible to use an SEP worker application in SEP network execution environments. The provision of SEP libraries facilitates the integration with an existing system. The SEPL language comprising the signal and event processing language, SEPL, functional operations are suitable for numeric and categorical time series processing. A set of SEPL functional operations can contain all operations needed by a field engineer for developing most of the condition monitoring tasks in an industrial system. The SEPL language comprising the SEPL functional operations and the SEP tools can be used for rapid development of condition monitoring applications in any kind of industrial system 1 such as oil and gas platforms, gas turbines or manufacturing lines.

For optimizing the data traffic for future industrial IoT applications aiming at condition monitoring tasks, SE data streams can be processed by the signal and event processing, SEP, engine at local edge devices without sending any needless information or data to the system cloud. For instance, the processed data streams can comprise high frequency data from accelerometers of the industrial system 1. To provide a well-timed reaction on crucial condition monitoring and monitoring tasks, the SEP worker application can process events in a streaming fashion and very close to the streaming sources of the industrial system. Accordingly, operators do not have to wait for a reaction from the analyzers in the system cloud. This is important for some real-life use cases where the internet bandwidth may be limited, e.g. for offshore platforms.

On each signal and event processing, SEP, engine, one or several SEPL scripts can be provided each comprising a sequence of SEPL operations. These SEPL operations comprise stateful functional event or data pattern matching SEPL operations and stateless functional SEPL operations. The SEPL script includes predefined stateful functional SEPL pattern matching operations adapted to perform a pattern matching between historic existing patterns and patterns within received SE data streams coming from sources of the industrial system 1. The pattern matching SEPL operations can comprise configurable time windows, in particular sliding time windows with configurable time window lengths. The observation windows can be used to collect a consecutive sequence of observations. Each function or operation can be used to aggregate one selected feature from the observations. Different types of windows can be used, in particular time windows, time batch windows, length windows, length batch windows or custom windows. Aggregators can be applied on selected features of observations. SEPL window event pattern matching operations can be realized similar to SEPL window aggregate operations. An example of a SEPL window event pattern matching operation is to perform a matching of a pattern where an event A (e.g. "shutdown") and another event B (e.g. "oil temperature too high") occur within a 5 minute window. The events or features A, B can be in different streams.

Figure 4:
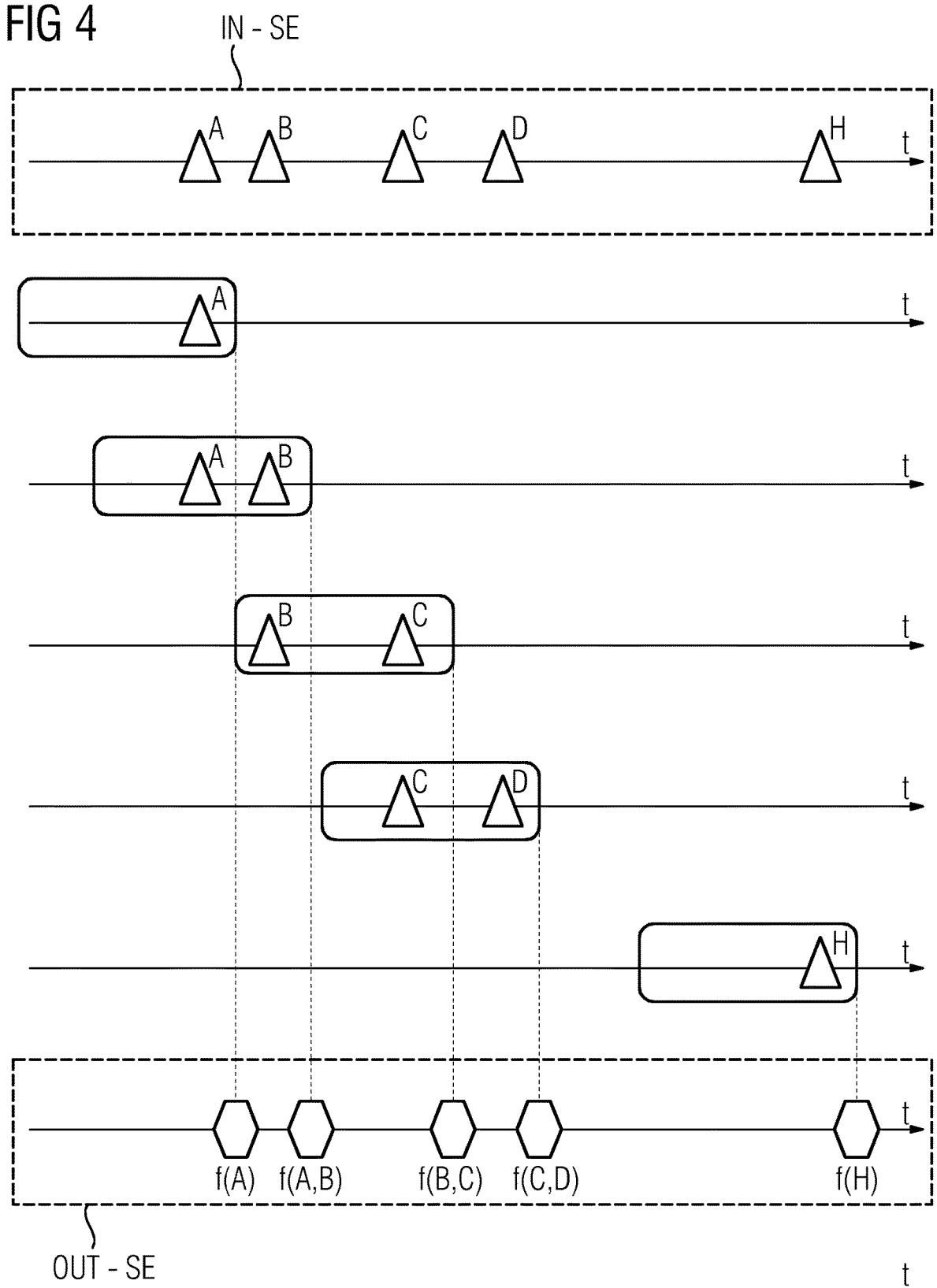
FIG. 4 shows a schematic diagram for illustrating a possible exemplary window operation which can be performed by a signal and event processing, SEP, engine according to an aspect of the present invention.

A time window can comprise as a main parameter its time window length TWL. When a new observation or event is received in a data stream, specified aggregators can be applied using all the observations received in the last time window length TWL interval. A possible operation mode of a time window is illustrated in FIG. 4. Input SE streams comprising events A, B, C, D, H are processed to generate an output SE stream as illustrated in FIG. 4.

An SEPL node adapted to provide a time window operation can comprise the following structure:

```
{
"InputStreamName":"_input_stream_name",
OutputStreamName":"_output_stream_name",
"Operation":"operation",
"Comment":"_comment",
"TimeWindowLengthInSeconds":_time_window_length_in_seconds,
"AgregatorList":
[
{"FeatureName":"_feature_1_name","Aggregator":"_aggregator_1",
"ResultFeatureName":"_result_feature_name_1"},
{"FeatureName":"feature_2_name","Aggregator":
"_aggregator_2","ResultFeatureName":"_result_feature_name_2"},
...
{"FeatureName":"_feature_N_name","Aggregator":"_aggregator_N",
"ResultFeatureName":"_result_feature_name_N"}
]
}
``` where the following parameters have to be filled in:
  _input_stream_name: the name of the stream which has to be used as input;
  _output_stream_name: string value representing the name of the output stream;
  _operation: string value representing the operation name. For time window operator should be "TimeWindow";
  _comment: contains a string description of the operator. It is mented to be used by the field engineer and it does not influence the processing. The field is optional;
  _time_window_length_in_seconds: the length of the time window;
  _feature_1_name, _feature_2_name, . . . , ":" _feature_N_ name: the features of the inputs streams which are going to be aggregates;
  _aggregator_1, _aggregator_2, . . . , _aggregator_N: the aggregators which have to be applied for the selected features (see Table 25);
  _result_feature_name_1, _result_feature_name_ 2, . . . , _result_feature_name_N: the observation published on the window output stream will contain these features.

The main configuration parameters of a time batch window operation are the time window length TWL representing the period of time for which events are collected into the window and a time window step TWS representing the distance in time between the starts of two consecutive time windows.

Figure 5:
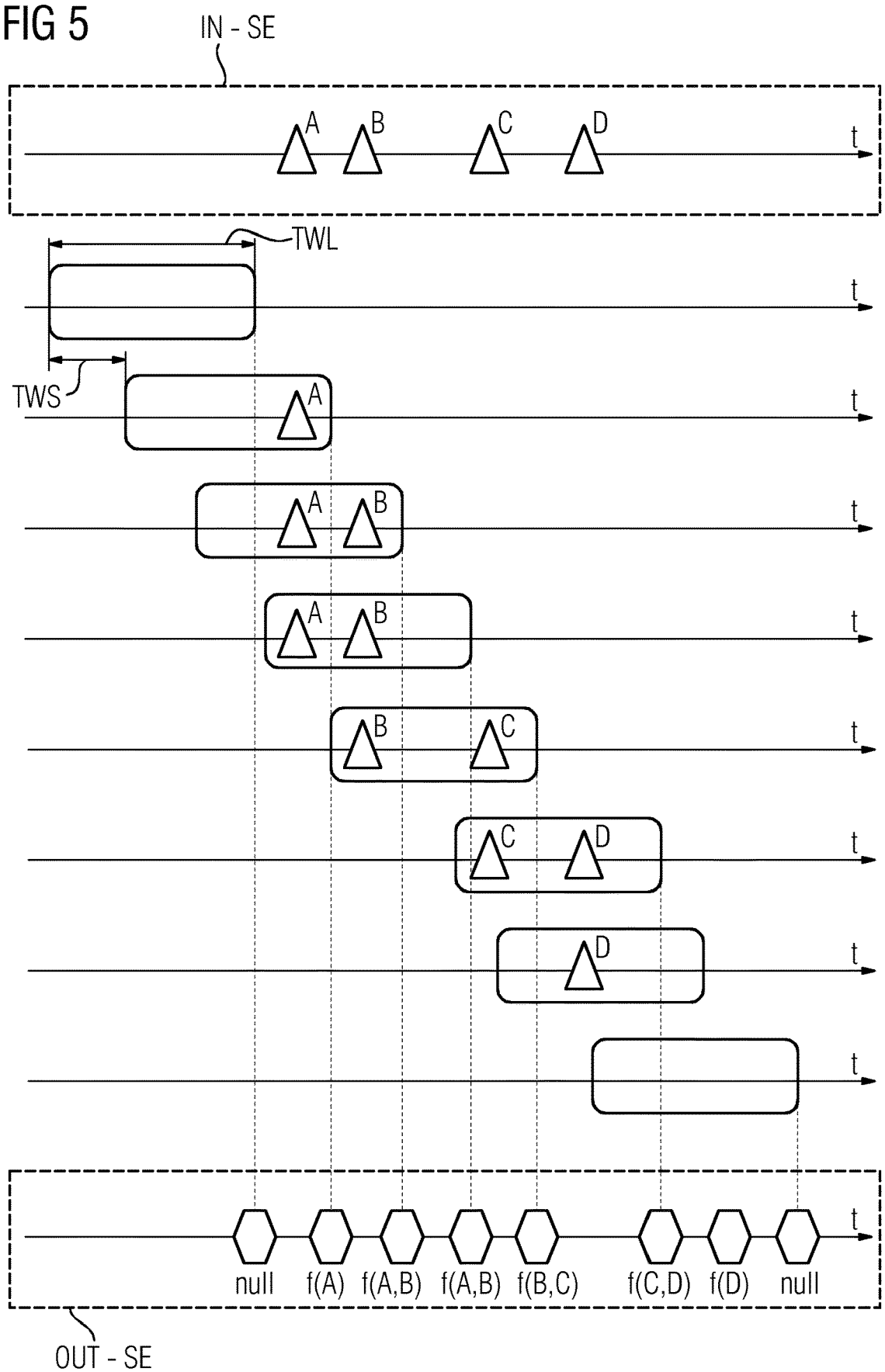
FIG. 5 shows a further schematic diagram for illustrating a possible exemplary window operation which can be performed by a signal and event processing, SEP, engine according to an aspect of the present invention.

FIG. 5 illustrates a time batch window SEPL operation.

In a possible embodiment, an SEPL processing node adapted to perform a time window SEPL operation can comprise the following structure:

```
{
"InputStreamName":"_input_stream_name",
OutputStreamName":"_output_stream_ name",
"Operation":"operation",
"Comment":"comment",
"TimeWindowLengthInSeconds":_time_window_length_in_seconds,
"TimeWindowStepInSeconds":_time_window_step_in_seconds,
"AgregatorList":
[
{"FeatureName":"_feature_1_name","Aggregator":"_aggregator_1",
"ResultFeatureName":"_result_feature_name_1"},
{"FeatureName":"_feature_2_name","Aggregator":"_aggregator_2",
"ResultFeatureName":"_result_feature_name_2"},
...
{"FeatureName":"_feature_N_name","Aggregator":"_aggregator_N",
"ResultFeatureName":"_result_feature_name_N"}
]
}
``` where the following parameters have to be filled in:
  _input_stream_name: the name of the stream which has to be used as input;
  _output_stream_name: string value representing the name of the output stream;
  operation: string value representing the operation name. For time window operator should be "TimeWindow";
  _comment: contains a string description of the operator. It is mented to be used by the field engineer and it does not influence the processing. The field is optional;
  _time_window_length_in_seconds: the length of the time window;
  _time_window_step_in_seconds: the step of the time window;
  _feature_1_name, _feature_2_name, . . . , ":" _feature_ N_name: the features of the inputs streams which are going to be aggregates;
  _aggregator_1, _aggregator_2, . . . , _aggregator_N: the aggregators which have to be applied for the selected features (see Table 25);
  _result_feature_name_1, _result_feature_name_ 2, . . . , _result_feature_name_N: the observation published on the window output stream will contain these features.

A point window applies an aggregator over the last observations received from a data stream regardless of the moment in time it has received the data stream. The considered number of observations can be defined by point window length parameters. If the point window is strict, it generates values only when it contains exactly the point window length observations.

Figure 6:
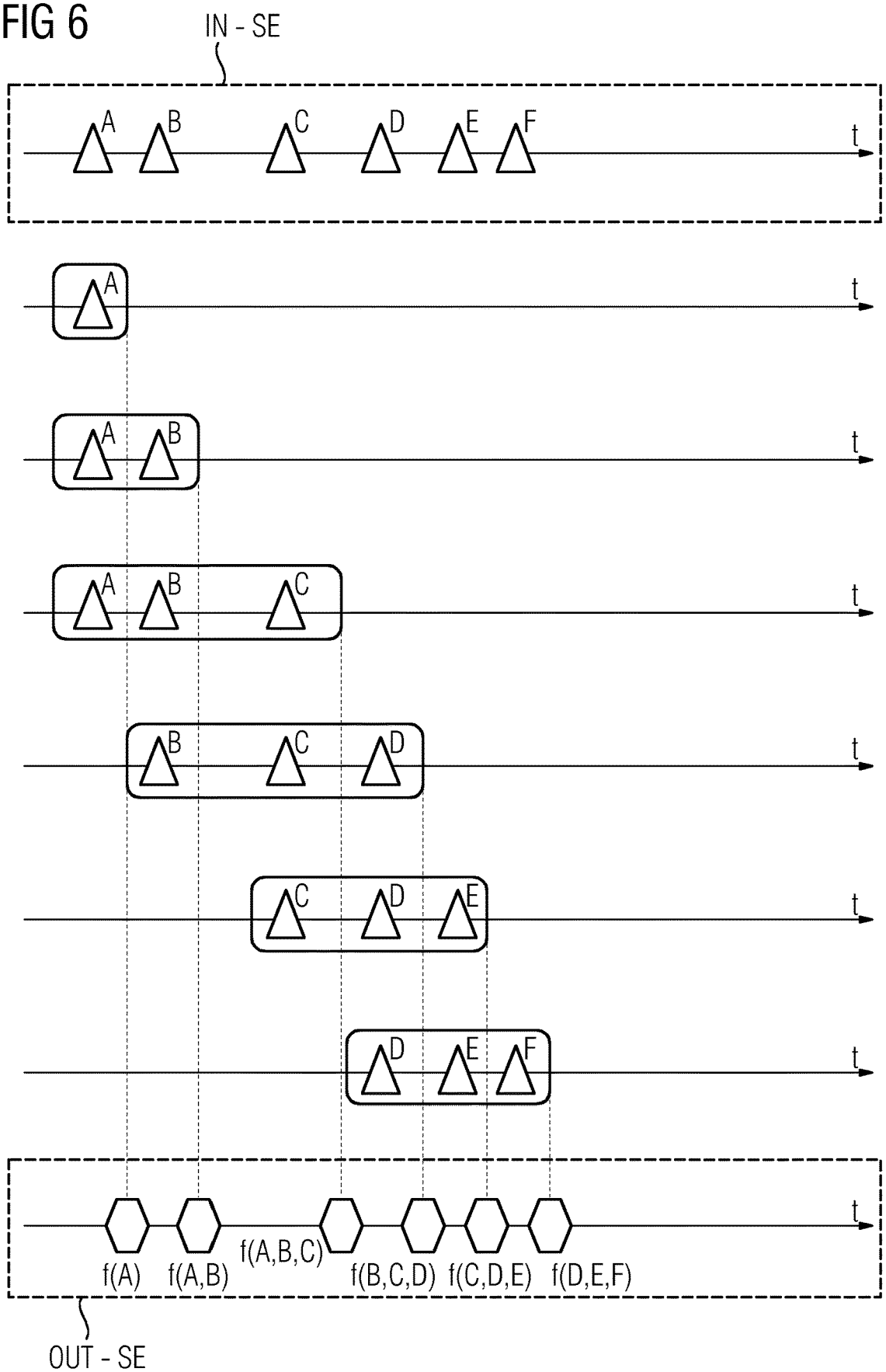
FIG. 6 shows a further schematic diagram for illustrating a possible exemplary embodiment of a window operation which can be performed by a signal and event processing, SEP, engine according to an aspect of the present invention.

FIG. 6 illustrates a point window SEPL operation. For a strict point window, the first two aggregated results illustrated in FIG. 6 are not delivered. FIG. 6 shows schematically a point window SEPL operation which can be performed by an SEP engine according to embodiments of the present invention. Input SE streams comprising a series of events A to F are processed to generate an output SE stream as illustrated in FIG. 6. An SEPL node adapted to perform an SEPL point window operation can comprise the following structure:

```
{
"InputStreamName":"_input_stream_name",
OutputStreamName":"_output_stream_name",
"Operation":"operation",
"Comment":"_comment",
"PointsWindowLength":_points_window_length,
"StrictPointsWindow":_strict_points_window,
"AgregatorList":
[
{"FeatureName":"_feature_1_name","Aggregator":"_aggregator_1",
"ResultFeatureName":"_result_feature_name_1"},
{"FeatureName":"_feature_2_name","Aggregator":"_aggregator_2",
"ResultFeatureName":"_result_feature_name_2"},
...
{"FeatureName":"_feature_N_name","Aggregator":"_aggregator_N",
"ResultFeatureName":"_result_feature_name_N"}
]
}
``` where the following parameters have to be filled in:
  _input_stream_name: the name of the stream which has to be used as input;
  _output_stream_name: string value representing the name of the output stream;
  _operation: string value representing the operation name. For points window operator should be "PointsWindow";
  _comment: contains a string description of the operator. It is mented to be used by the field engineer and it does not influence the processing. The field is optional;
  _points_window_length: the number of observations to be included in the points window;
  _strict_points_window: Boolean parameter specifying is points window is strict or not;
  _feature_1_name, _feature_2_name, . . . , ":" _feature_N_name: the features of the inputs streams which are going to be aggregates;
  _aggregator_1, _aggregator_2, . . . , _aggregator_N: the aggregators which have to be applied for the selected features (see Table 25);
  _result_feature_name_1, _result_feature_name_2, . . . , _result_feature_name_N: the observation published on the window output stream will contain these features.

For the point window operation, the following parameters can be used. Parameters can comprise a point window length representing the number of observations which have to be stored by the window and a point window step specifying the number of observations which have to be skipped between two window starts.

Figure 7:
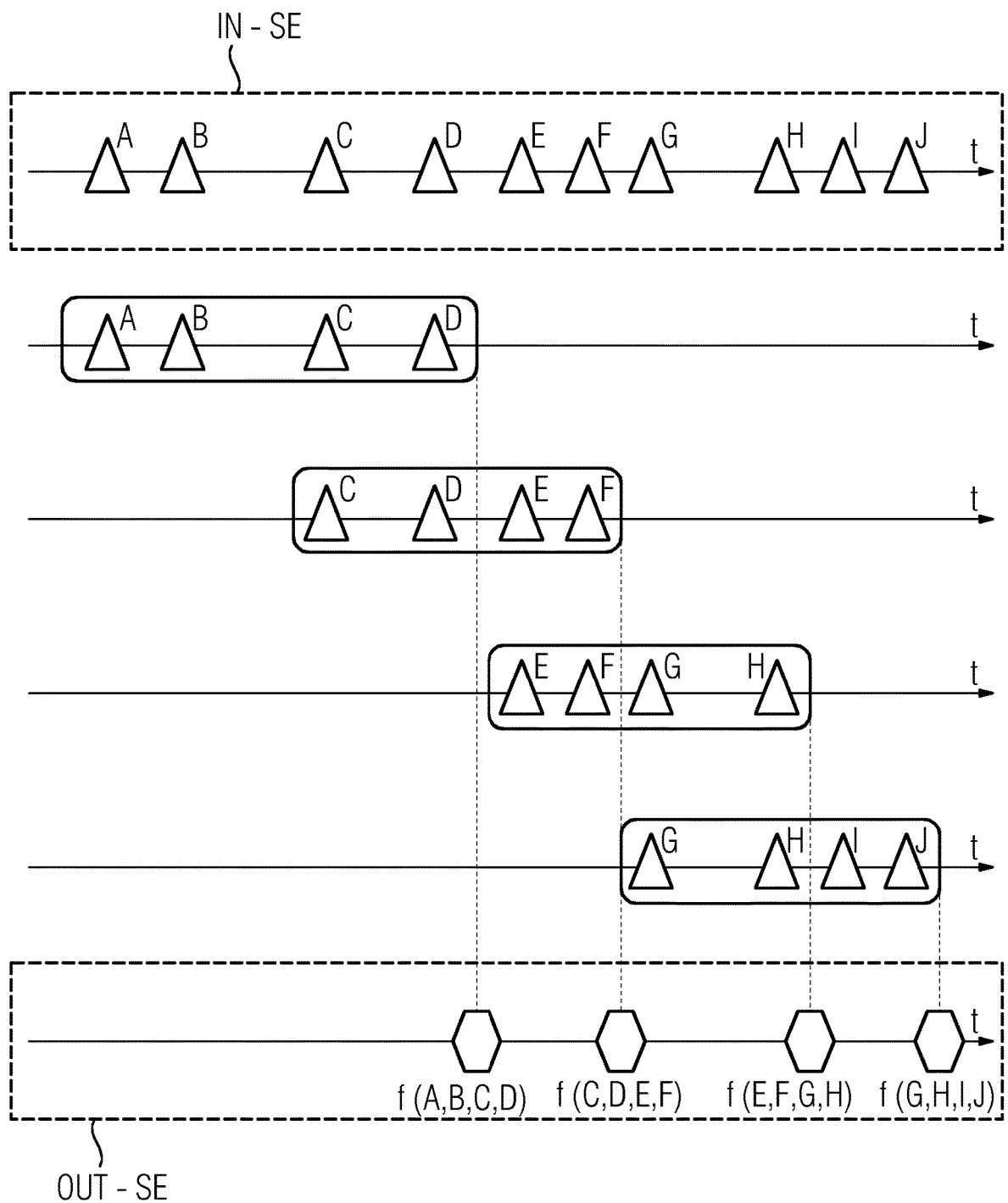
FIG. 7 shows a further schematic diagram for illustrating a possible exemplary window operation which can be performed by a signal and event processing, SEP, engine according to an aspect of the present invention.

FIG. 7 illustrates schematically a point window SEPL operation mode which can be performed by an SEP engine according to embodiments of the present invention. An SEPL processing node adapted to perform a point window operation can comprise the following structure:

```
{
"InputStreamName":"_input_stream_name",
OutputStreamName":"_output_stream_name",
```

-continued
```
"Operation":"operation",
"Comment":"_comment",
"PointsWindowLength":_points_window_length,
"StrictPointsWindow":_strict_points_window,
"PointsWindowStep":_points_window_step,
"AgregatorList":
[
{"FeatureName":"_feature_1_name","Aggregator":"_aggregator_1",
"ResultFeatureName":"_result_feature_name_1"},
{"FeatureName":"_feature_2_name","Aggregator":"_aggregator_2",
"ResultFeatureName":"_result_feature_name_2"},
...
{"FeatureName":"_feature_N_name","Aggregator":"_aggregator_N",
"ResultFeatureName":"_result_feature_name_N"}
]
}
``` where the following parameters have to be filled in:
  _input_stream_name: the name of the stream which has to be used as input;
  _output_stream_name: string value representing the name of the output stream;
  _operation: string value representing the operation name. For points window operator should be "PointsWindow";
  _comment: contains a string description of the operator. It is mented to be used by the field engineer and it does not influence the processing. The field is optional;
  _points_window_length: the number of observations to be included in the points window;
  _points_window_step: the number observations which have to be skipped between two window starts;
  _feature_1_name, _feature_2_name, . . . , ":" _feature_N_name: the features of the inputs streams which are going to be aggregates;
  _aggregator_1, _aggregator_2, . . . , _aggregator_N: the aggregators which have to be applied for the selected features;
  _result_feature_name_1, _result_feature_name_2, . . . , _result_feature_name_N: the observation published on the window output stream will contain these features.

A custom window operation consumes two input SE streams. The input SE streams can contain observations which have to be aggregated. The input trigger stream can contain at least one Boolean feature (selected by a user) which can be used to trigger the start and the stop of the custom window. A change from false to true of the Boolean value can trigger the start of the custom window, or respectively a change from true to false can stop the custom window operation. The aggregation results can be computed and published on the output SE stream after the stop of the custom window.

Figure 8:
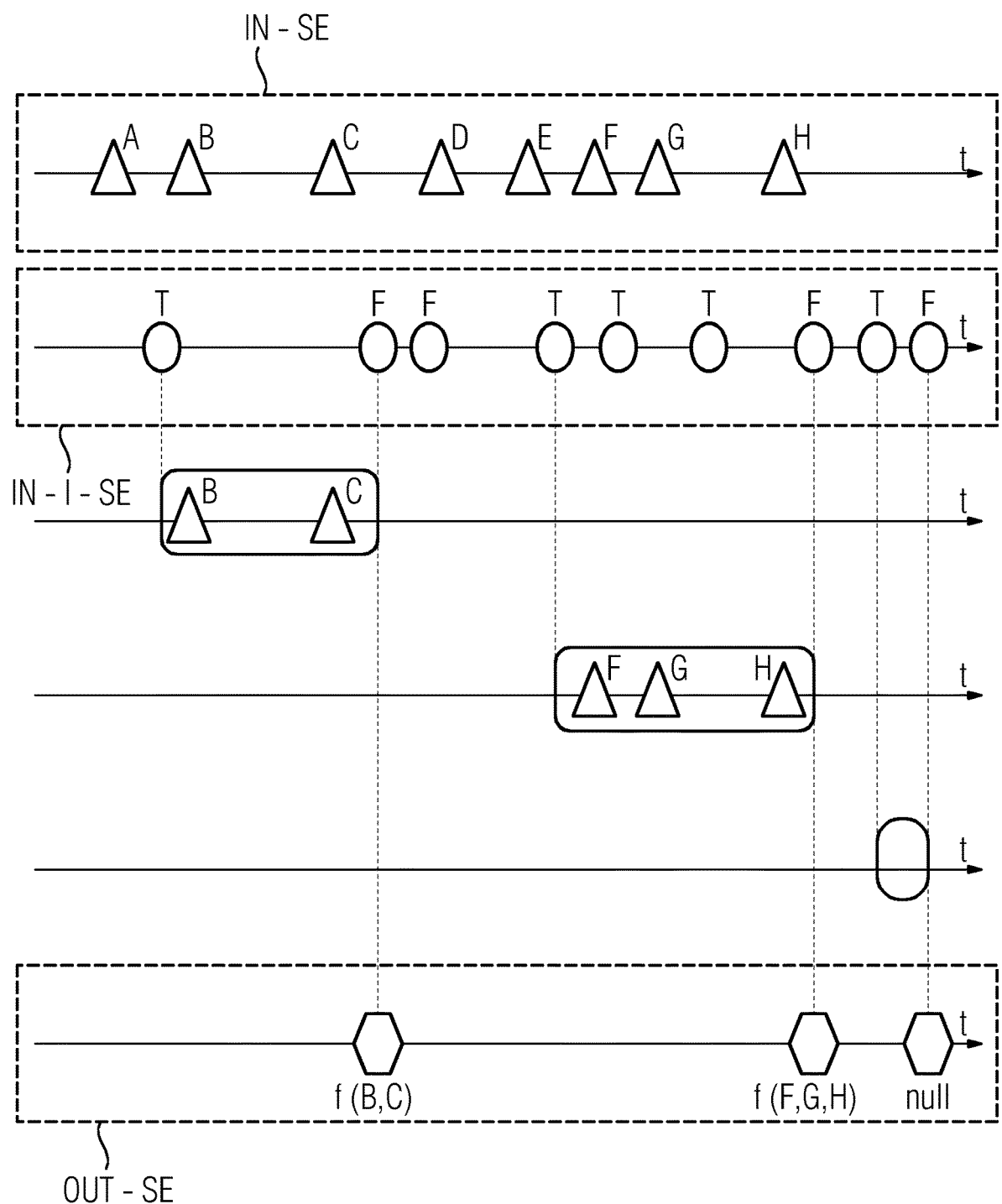
FIG. 8 shows a further schematic diagram for illustrating a possible exemplary window operation which can be performed by a signal and event processing, SEP, engine according to an aspect of the present invention.

FIG. 8 shows schematically a custom window SEPL operation which can be performed by an SEP engine according to embodiments of the present invention. An SEPL processing node adapted to perform a custom window SEPL operation on an input signal and event data stream SE and an input trigger SE can comprise in a possible implementation the following structure:

```
{
"InputStreamName":"_input_stream_name",
"InputTriggerStreamName":"_input_trigger_stream_name",
"TriggerFeature":"_trigger_feature";
OutputStreamName":"_output_stream_name",
```

```
"Operation":"operation",
"Comment":"_comment",
"AgregatorList":
[
{"FeatureName":"_feature_1_name","Aggregator":"_aggregator_1",
"ResultFeatureName":"_result_feature_name_1"},
{"FeatureName":"_feature_2_name","Aggregator":"_aggregator_2",
"ResultFeatureName":"_result_feature_name_2"},
...
{"FeatureName":"_feature_N_name","Aggregator":"_aggregator_N",
"ResultFeatureName":"_result_feature_name_N"}
]
}
``` where the following parameters have to be filled in:
_input_stream_name: the name of the stream which has to be used as input;
_input_trigger_stream_name: the name of the stream which has to be used as window trigger;
_trigger_feature: the Boolean feature from the input_trigger_stream_name which is used for starting and stopping the windows;
_output_stream_name: string value representing the name of the output stream;
_operation: string value representing the operation name. For points window operator should be "PointsWindow";
_comment: contains a string description of the operator. It is mented to be used by the field engineer and it does not influence the processing. The field is optional;
_feature_1_name, _feature_2_name, . . . , ":" _feature_N_name: the features of the inputs streams which are going to be aggregates;
_aggregator_1, _aggregator_2, . . . , _aggregator_N: the aggregators which have to be applied for the selected features;
_result_feature_name_1, _result_feature_name_2, . . . , _result_feature_name_N: the observation published on the window output stream will contain these features.

An SEPL script of the deployed SEP engine can comprise in a possible embodiment one or more predefined stateful functional SEPL delay operations used for delaying SE data streams received by subscriber nodes of the SEP engine with configurable delay time periods. The SEPL delay operation performs a delay operation on the events sent over an SE stream. The operation produces a new stream where the events from the input stream are published with a given time delay without changing their payload. A processing node of the SEPL script or SEP network can operate in two modes based on the definition of the delay.

Figure 9:
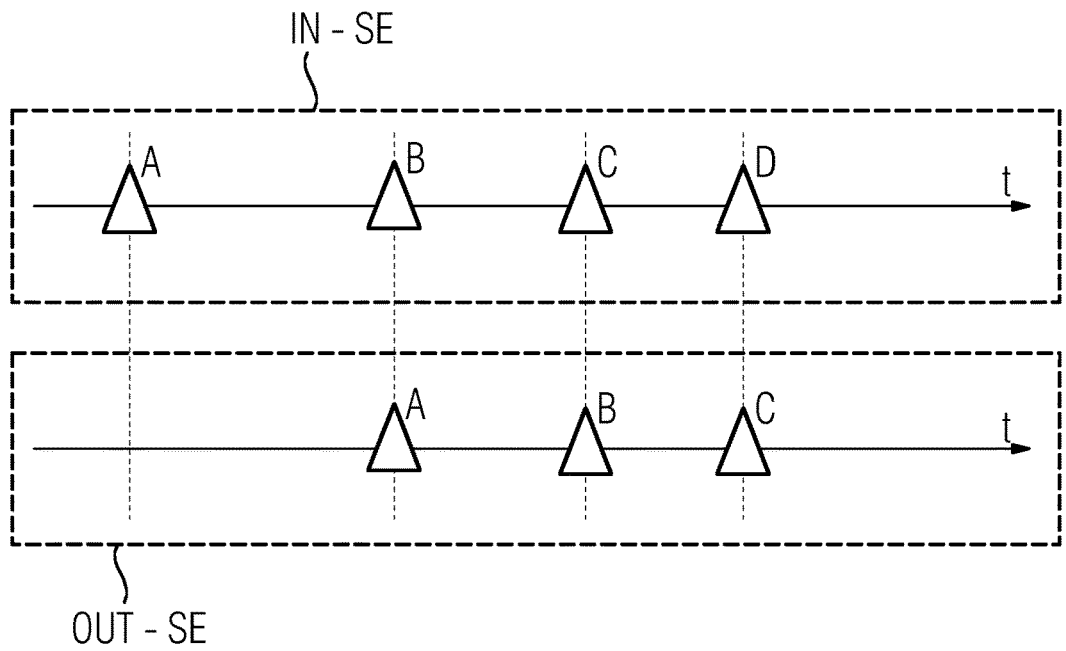
FIG. 9 shows a further schematic diagram for illustrating a possible exemplary delay operation which can be performed by a signal and event processing, SEP, engine according to an aspect of the present invention.

If the delay is based on a given number of events, the input event is forwarded to the output stream only after the defined number of events has been received on the input stream. For example, if the number of delay events is one in the input stream and an event has been received in the input stream, this is going to be forwarded after receiving another event in the input stream as illustrated also in FIG. 9. The number of events can comprise any integer value. FIG. 9 illustrates a delay operation based on a defined number of events.

Figure 10:
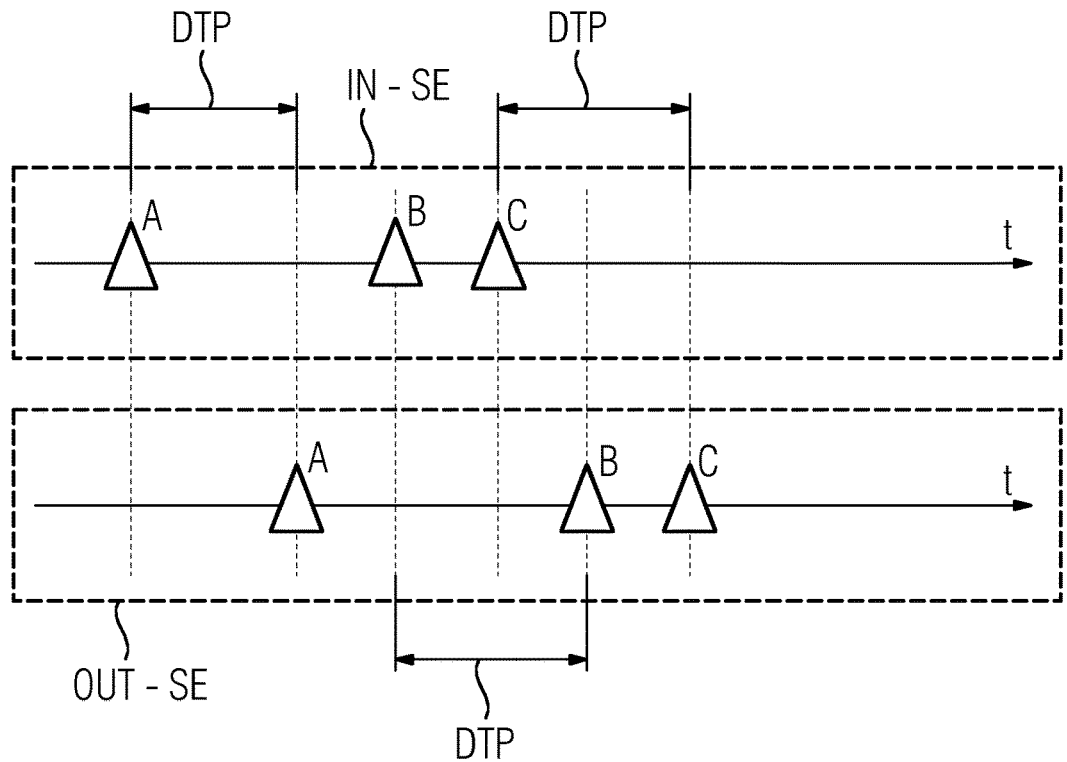
FIG. 10 shows a further schematic diagram for illustrating a possible exemplary delay operation which can be performed by a signal and event processing, SEP, engine according to an aspect of the present invention.

In an alternative mode, the definition of the delay can be based on a given time period. In this mode, the input event is forwarded to the output SE stream only after it had passed the delay time period DTP specified for the operation as also illustrated in FIG. 10. FIG. 10 illustrates a delay based on a time period.

An SEPL processing node adapted to perform a delay operation can comprise the following structure:

```
{
  "InputStreamName":"_input_stream_name",
  OutputStreamName":"_output_stream_name",
  "Operation":"operation",
  "Comment":"_comment",
  "Mode":"_ mode",
  "DelayEvents":"_delayEvents"
  "DelayInSeconds":"_delayInSeconds"
}
``` where the following parameters have to be filled in:
_input_stream_name: the name of the stream which has to be used as input;
_output_stream_name: string value representing the name of the output stream;
_operation: string value representing the operation name. For delay operator should be "Delay";
_comment: contains a string description of the operator. It is mented to be used by the field engineer and it does not influence the processing. The field is optional;
_mode: string value representing the operation mode of the operator. This parameter can be "NumberEvents" or "TimePeriod";
_delayEvents: numeric value representing the number of delay events. It is optional;
_delayInSeconds: numeric value representing the number of seconds. It is optional.

Besides the stateful functional event or data pattern matching and/or delaying SEPL operations, the set of SEPL operations can comprise stateless functional SEPL operations.

The set of stateless functional SEPL operations can comprise a subscriber SEPL operation where a subscriber node of the SEP network is used to push observations into the SEP engine to be processed. At run time, the subscriber node SUBN can convert each observation or event received according to a feature set description. The converted observation can be published on an internal SEPL engine stream.

The SEPL operation set can further comprise a null handling SEPL operation wherein a node is used to handle the features which contain null values.

The SEPL operation set can further comprise a merge SEPL operation which can be used to merge two SE data streams into one new SE stream. The output stream contains the union of the features from the input streams plus a timestamp field depending on the merge operation mode.

The SEPL operation set can further comprise a convert SEPL operation adapted to perform a conversion operation using one feature of the data stream. The convert SEPL operation produces a new stream where the result of the computation can replace the value of the converted feature.

The SEPL operation set can further comprise in a possible embodiment arithmetical functions, in particular arithmetical operations using one or two features of a data stream. The arithmetical operations can for instance comprise an add, subtract, a multiply, a division, a comparison or a logic operation.

A unary arithmetical SEPL operation can also be provided to perform an arithmetical operation using only one feature of the data stream. These operations can for instance comprise an operation to generate an absolute value of a numeric value or an operation to generate a logarithm of a numeric value. Other functions comprise for instance a cosine or a sinus function providing a cosine or sinus value of a numeric value. The SEPL operations can further comprise arithmetical functions and operations with more than one arguments providing for instance a minimum or a maximum of multiple numeric values. Further, SEPL operations with more than one arguments can comprise an operation generating a mean value or a medium value or a sum value of multiple numeric values.

The SEPL operation set used by the SEP engine according to embodiments of the present invention can further comprise a select SEPL operation which is adapted to select a list of features of a data stream. The operation produces a new data stream where the selected features are published.

The SEPL operation set can further comprise a unary string processing operation which produces a new stream where the result of the computation can extend a feature list or can replace the value of an existing feature.

The SEPL operation set can further comprise unary data time processing operations. The operation produces a new stream where the result of the computation can extend a feature list or can replace the value of an existing feature. For instance, an operation can convert a value of a current date time object to a local time. Further, it can for instance check if a date time is on a weekend or a workday.

The SEPL operation set can further comprise data time processing with more than one argument. The operation can for instance return a new date time that adds a specified number of years, months, days, or hours, minutes, seconds, or milliseconds to a received value of a data stream.

The SEPL operation set can further comprise a filter operation which can filter events received in a SE stream based on a selected Boolean feature. The operation produces a new SE stream where only the events are published with a selected Boolean feature equal to "true".

SEPL scripts used by an SEP engine according to embodiments of the present invention can comprise a sequence of different SEPL operations which may be loaded from an SEPL script library stored in a database of the system. The loaded SEPL scripts can be easily instantiated for the respective target device TD and/or industrial system 1. This can be easily done by a field engineer having expert knowledge of the different assets of the respective industrial system 1.

Figure 11:
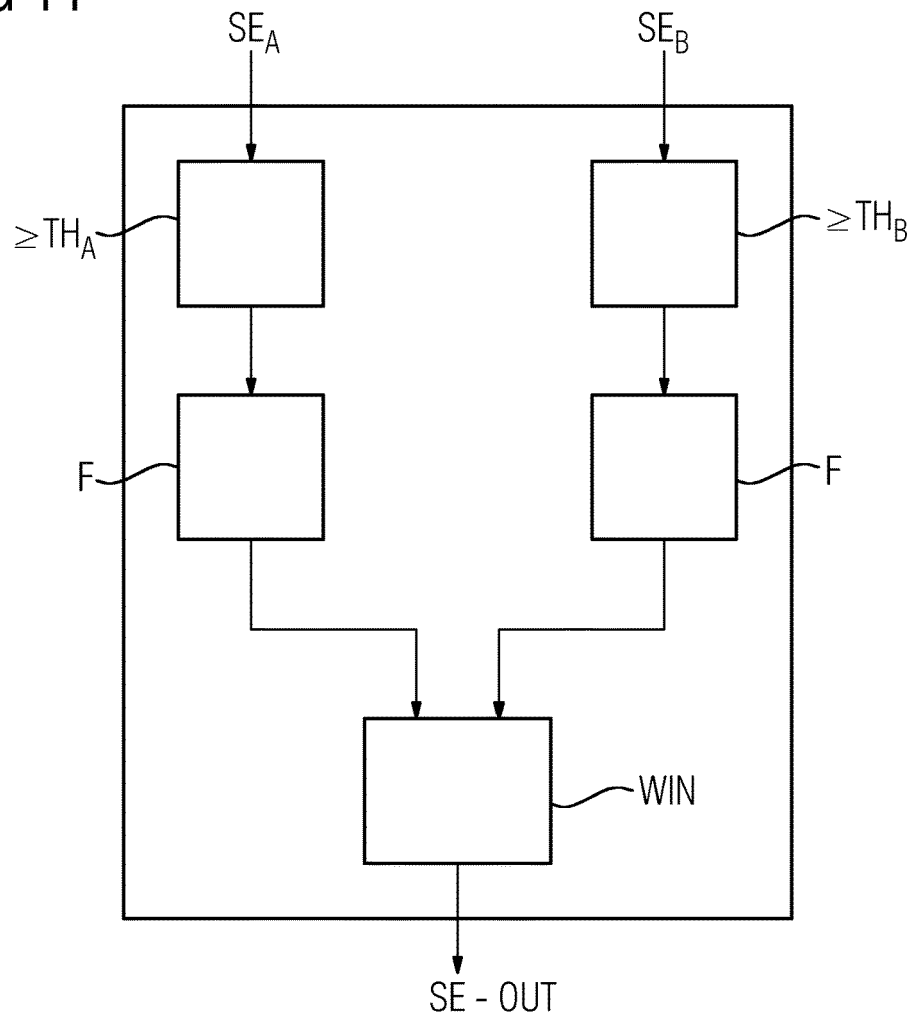
FIG. 11 illustrates a simple example of an SEPL script which can be implemented by an SEP engine according to the present invention.
Figure 12:
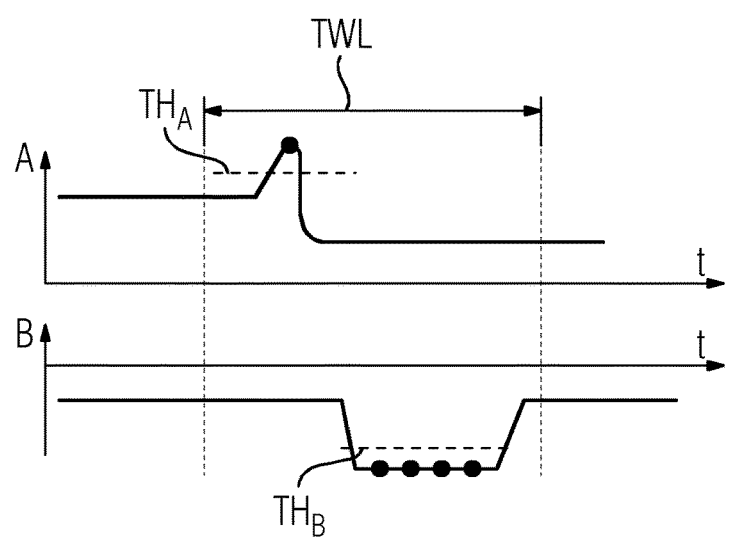
FIG. 12 illustrates two received data streams A, B which are processed by the SEP engine according to the SEPL script illustrated in FIG. 11.

FIG. 11 shows a simple example of an SEPL script which can be implemented in an SEP engine according to the first aspect of embodiments of the present invention. In the illustrated simple example of FIG. 11, the SEPL script consists of five different SEPL operations which can belong to a predetermined set of SEPL operations stored in a memory or in a database. The different SEPL operations can be loaded from an SEP library and customized for the respective use case. FIG. 12 illustrates two received data streams A, B which are processed by the SEP engine according to the SEPL script illustrated in FIG. 11. A first signal and event data stream SEA is compared with a threshold value $TH_A$ and a second signal and event data stream SEB is compared with a second threshold value $TH_B$. Both signal and event data streams are then filtered by an SEPL filter operation and are then processed by an SEPL window and pattern matching operation to generate an output signal and event data stream for further processing. For instance, the output signal and event data stream can comprise a stream of alarm events. If in an industrial system 1 or a machine a signal and event pattern as illustrated in FIG. 12 occurs within a time window of time window length TWL the SEP engine generates automatically an alarm event or an alarm observation. This event can be sent in a stream to another entity or target device which may comprise in a possible implementation another SEP engine adapted to process the received signal and event data stream including the alarm events generated by the SEPL script illustrated in FIG. 11. In a possible embodiment, the SEPL script as illustrated in FIG. 11 can be visualized in an editing mode to a user. The SEPL script as illustrated in FIG. 11 can be generated by a field engineer without requiring any specific programming skills but having knowledge of the industrial assets of the industrial system 1. For instance, the field engineer can set the threshold values and the comparison SEPL operation according to his expertise with respect to the machine or industrial system 1. Also, the time window length TWL may be set by a field engineer creating the simple SEPL script shown in FIG. 11.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A signal and event processing, SEP, engine deployed on a target device of an industrial system, wherein the SEP engine includes at least one hardware processing unit, and wherein the SEP engine comprises:
    subscriber nodes adapted to receive at least one of signal and event, SE, data streams from sources of the industrial system;
    processing nodes adapted to perform signal and event processing language, SEPL, functional operations on the received SE data streams according to an SEPL script of the SEP engine, wherein the SEPL script includes predefined stateful event or data pattern matching operations to generate result SE data streams; and
    publisher nodes adapted to forward the generated result SE data streams to sinks of the industrial system;
    wherein the SEPL script of the SEP engine includes one or more predefined stateful functional SEPL delay operations each adapted to delay SE data streams received by subscriber nodes of the SEP engine with configurable delay time periods to generate delayed SE data streams output as result SE data streams by publisher nodes of the deployed SEP engine.

2. The signal and event processing, SEP, engine according to claim 1, wherein each node of the SEP engine deployed on the target device is adapted to perform an associated functional operation forming part of the SEPL script,
    wherein the functional operation comprises a stateless functional SEPL operation or a stateful functional SEPL operation.

3. The signal and event processing, SEP, engine according to claim 1, wherein each processing node of the deployed SEP engine is adapted to apply a predefined SEPL functional operation on SE data streams received by at least one subscriber node or output by at least one preceding processing node and to deliver a resulting SE data stream to at least one of a subsequent processing node and to a publisher node of the deployed SEP engine.

4. The signal and event processing, SEP, engine according to claim 1, wherein the SE data streams comprise
    signal data streams generated by signal generation sources of at least one of the industrial system and event data streams generated by event generation sources of the industrial system.

5. The signal and event processing, SEP, engine according to claim 1 wherein the event data stream comprises a time series of events containing features represented as key-value pairs.

6. The signal and event processing, SEP, engine according to claim 1 wherein the signal data stream comprises sensor data streams provided by sensors forming sources of the industrial system.

7. The signal and event processing, SEP, engine according to claim 1 wherein the nodes of the deployed SEP engine form an SEP network comprising a directed acyclic graph, DAG.

8. The signal and event processing, SEP, engine according to claim 1 wherein the deployed SEP engine is implemented as a software component or as a hardware component and deployed on the target device forming part of the industrial system or being connected to the industrial system.

9. The signal and event processing, SEP, engine according to claim 1 wherein the target device on which the SEP engine is deployed comprises a programmable logic controller, PLC,
a computer,
a computer cluster, a client, a server, a control unit of the industrial system or a cloud unit of a network cloud connected to the industrial system.

10. The signal and event processing, SEP, engine according to claim 1 wherein the sources adapted to supply SE data streams to the subscriber nodes of the deployed SEP engine and/or the sinks adapted to receive the generated result SE data streams from the publisher nodes of the SEP engine comprise entities including at least one of other SEP engines, clients, servers and databases of the industrial system.

11. The signal and event processing, SEP, engine according to claim 1 wherein the SEP engine is configured to communicate with other SEP engines deployed on other target devices or target entities of the industrial system by an event message broker.

12. The signal and event processing, SEP, engine according to claim 1 wherein the SEPL scripts of the SEP engine are loaded from an SEPL script library stored in a domain specific or cross domain knowledge database and instantiated for the respective target device of the industrial system.

13. The signal and event processing, SEP, engine according to claim 1 wherein the SEPL script of the deployed SEP engine includes one or more predefined stateful functional SEPL window event pattern matching operations each adapted to validate event patterns mined from historic data of recorded and stored SE data streams within an SE data stream received by a subscriber node of the batch processing SEP engine for a sliding time window with a configurable time window length to generate matching results forming a result SE data stream output by a publisher node of the deployed batch processing SEP engine.

14. The signal and event processing, SEP, engine according to claim 1 wherein the SEPL script comprises besides stateful functional event or data pattern matching or delaying SEPL operations stateless functional SEPL operations comprising:
subscriber SEPL operations, constant determining SEPL operations, conversion SEPL operations, SE data stream merging SEPL operations, arithmetical functional operations with one or more arguments, select SEPL operations to select features from SE data streams, string processing SEPL operations, data time SEPL operations, filter SEPL operations and publishing SEPL operations.

15. The signal and event processing, SEP, engine according to claim 1 wherein predefined SEP engines provided for different language types including C++, C-Sharp, Java are stored with an associated SEPL script library in a knowledge database, wherein a fitting SEPL engine is loaded, instantiated and deployed on a target device of the industrial system.

16. A system conditioning monitoring, SCM, and/or condition-based maintenance, CBM, platform comprising one or more SEP engines according to claim 1, wherein SCM/CBM rules of the platform are written as SEPL scripts of an SEP engine deployed on target devices of the industrial system.

17. A target device of an industrial system comprising at least one SEP engine according to claim 1 instantiated and deployed on the target device,
wherein the deployed SEP engine is executable to perform online and/or offline processing of SE data streams received from sources of the industrial system to generate result SE data streams forwarded to sinks of the industrial system.

18. A method for at least one of online and offline processing of at least one of signal and event, SE, data streams of an industrial system,
the method comprising the steps of:
(a) receiving SE data streams from sources of the industrial system;
(b) performing signal and event processing language, SEPL, functional operations on the received SE data streams according to an SEPL script of a signal and event, SEP, engine deployed on at least one target device of the industrial system,
wherein the SEPL script includes predefined stateful event or data pattern matching operations to generate result SE data streams; and
(c) forwarding the generated result SE data streams to sinks of the industrial system;
wherein the SEPL script of the SEP engine includes one or more predefined stateful functional SEPL delay operations each adapted to delay SE data streams received by subscriber nodes of the SEP engine with configurable delay time periods to generate delayed SE data streams output as result SE data streams by publisher nodes of the deployed SEP engine.

* * * * *